(12) United States Patent
Klein

(10) Patent No.: US 7,996,474 B2
(45) Date of Patent: Aug. 9, 2011

(54) PLACING EMAIL SUBSTRINGS IN A NEW CHRONOLOGICAL ORDER

(76) Inventor: David Klein, Rehovot (IL)

( * ) Notice: Subject to any disclaimer, the term of this patent is extended or adjusted under 35 U.S.C. 154(b) by 348 days.

(21) Appl. No.: 12/043,196

(22) Filed: Mar. 6, 2008

(65) Prior Publication Data

US 2008/0222259 A1 Sep. 11, 2008

(51) Int. Cl.
G06F 15/16 (2006.01)
(52) U.S. Cl. ......... 709/206; 709/207; 709/208; 709/209
(58) Field of Classification Search .................. 709/206, 709/207, 208, 209, 205, 204
See application file for complete search history.

(56) References Cited

U.S. PATENT DOCUMENTS

| 7,222,299 B1 * | 5/2007 | Lim et al. ....................... 715/273 |
| 2004/0044735 A1 * | 3/2004 | Hoblit ............................ 709/206 |
| 2005/0075880 A1 * | 4/2005 | Pickover et al. ............... 704/270 |
| 2006/0069734 A1 * | 3/2006 | Gersh et al. .................... 709/207 |
| 2007/0282956 A1 * | 12/2007 | Staats ............................. 709/206 |

* cited by examiner

*Primary Examiner* — Jeffrey Pwu
*Assistant Examiner* — Abdelnabi O Musa
(74) *Attorney, Agent, or Firm* — Dekel Patent Ltd.; David Klein

(57) ABSTRACT

A method and system for placing, displaying and printing email strings in different chronological orders.

8 Claims, 5 Drawing Sheets

-----Original Message-----
From: Dekel Patent Ltd.
Sent: Tuesday, September 13, 2005 11:59 AM
To: Ugryumov, Vladislav
Cc: Reuven Borokovsky; Arievich, Eugene
Subject: Re: Russian Patent Application - Your Ref 2004214ru - Our Ref 1428MUL-RU Dear Vlad
I will give you instructions from our client.
David ----- Original Message -----
From: Ugryumov, Vladislav
To: Dekel Patent Ltd.
Sent: Tuesday, October 25, 2005 8:20 AM
Subject: RE: Russian Patent Application - Your Ref 2004214ru - Our Ref 1428MUL-RU
Dear David, Referring to your {above} communication I would like to remind you that a request for substantive examination should be filed with the Russian Patent Office by November 26, 2005 due date.
We look forward to hearing from you on the matter. Thank you.

Sincerely,

Vlad

-----Original Message-----
From: Dekel Patent Ltd.
Sent: Thursday, November 17, 2005 3:02 PM
To: Ugryumov, Vladislav
Subject: Re: Russian Patent Application - Your Ref 2004214ru - Our Ref 1428MUL-RU
Importance: High Dear Vlad, We have just now received written instructions from the client to ABANDON this case.
Please abandon without further cost.

Thank you very much,
David Klein
Dekel Patent Ltd.
****************************************************************
The information transmitted is intended only for the person or entity to which it is addressed and may contain confidential and/or privileged material. Any review, retransmission, dissemination or other use of, or taking of any action in reliance upon, this information by persons or entities other than the intended recipient is prohibited. If you received this in error, please contact the sender and delete the material from any computer.
****************************************************************

-----Original Message-----
From: Dekel Patent Ltd.
Sent: Thursday, November 17, 2005 3:02 PM
To: Ugryumov, Vladislav
Subject: Re: Russian Patent Application - Your Ref 2004214ru - Our Ref 1428MUL-RU
Importance: High Dear Vlad, We have just now received written instructions from the client to ABANDON this case. Please abandon without further cost.

Thank you very much,

David Klein
Dekel Patent Ltd.
*************************************************************************
The information transmitted is intended only for the person or entity to which it is addressed and may contain confidential and/or privileged material. Any review, retransmission, dissemination or other use of, or taking of any action in reliance upon, this information by persons or entities other than the intended recipient is prohibited. If you received this in error, please contact the sender and delete the material from any computer.
*************************************************************************
----- Original Message -----
From: Ugryumov, Vladislav
To: Dekel Patent Ltd.
Sent: Tuesday, October 25, 2005 8:20 AM
Subject: RE: Russian Patent Application - Your Ref 2004214ru - Our Ref 1428MUL-RU
Dear David, Referring to your below communication I would like to remind you that a request for substantive examination should be filed with the Russian Patent Office by November 26, 2005 due date.

We look forward to hearing from you on the matter. Thank you.

Sincerely,

Vlad

-----Original Message-----
From: Dekel Patent Ltd.
Sent: Tuesday, September 13, 2005 11:59 AM
To: Ugryumov, Vladislav
Cc: Reuven Borokovsky; Arievich, Eugene
Subject: Re: Russian Patent Application - Your Ref 2004214ru - Our Ref 1428MUL-RU Dear Vlad
I will give you instructions from our client.
David

FIG. 1A
PRIOR ART thank you so much!
Do you have a current # for Chaya, or is it the same?
We just mailed off some pics for Tovi and Chevi...
Love,
Abby --- "Dekel Patent Ltd." wrote:
> Dear Abby,
>
> Jan 27 is fine. Looking forward to seeing you.
>
> David > > ----- Original Message -----
> > From: "Abigail Leichman"
> > To: "Dekel Patent Ltd."
> > Sent: Friday, December 16, 2005 5:00 AM
> > Subject: travel plans
> >
> > Mama tells me you'd like me to take along some things
> > for your family, and so it's as good a time as any to ask you about the possibility of spending our
> > second week with you
> > Love,
> >
> > Abby
> >

FIG. 1B
PRIOR ART

-----Original Message-----
From: Dekel Patent Ltd.
Sent: Tuesday, September 13, 2005 11:59 AM
To: Ugryumov, Vladislav
Cc: Reuven Borokovsky; Arievich, Eugene
Subject: Re: Russian Patent Application - Your Ref 2004214ru - Our Ref 1428MUL-RU Dear Vlad
I will give you instructions from our client.
 David ----- Original Message -----
From: Ugryumov, Vladislav
To: Dekel Patent Ltd.
Sent: Tuesday, October 25, 2005 8:20 AM
Subject: RE: Russian Patent Application - Your Ref 2004214ru - Our Ref 1428MUL-RU
Dear David, Referring to your {above} communication I would like to remind you that a request for substantive examination should be filed with the Russian Patent Office by November 26, 2005 due date.
 We look forward to hearing from you on the matter. Thank you.

Sincerely,

Vlad

-----Original Message-----
From: Dekel Patent Ltd.
Sent: Thursday, November 17, 2005 3:02 PM
To: Ugryumov, Vladislav
Subject: Re: Russian Patent Application - Your Ref 2004214ru - Our Ref 1428MUL-RU
Importance: High Dear Vlad, We have just now received written instructions from the client to ABANDON this case.
Please abandon without further cost.

Thank you very much,
 David Klein
Dekel Patent Ltd.
*************************************************************************
The information transmitted is intended only for the person or
entity to which it is addressed and may contain confidential
and/or privileged material. Any review, retransmission,
dissemination or other use of, or taking of any action in reliance
upon, this information by persons or entities other than the
intended recipient is prohibited. If you received this in error,
please contact the sender and delete the material from any
computer.
*************************************************************************

FIG. 2A

>> ----- Original Message -----
>> From: "Abigail Leichman"
>> To: "Dekel Patent Ltd."
>> Sent: Friday, December 16, 2005 5:00 AM
>> Subject: travel plans
>>
>> Mama tells me you'd like me to take along some things
>> for your family, and so it's as good a time as any to ask you about the possibility of spending our
>> second week with you
>> Love,
>>
>> Abby
>>

--- "Dekel Patent Ltd." wrote:
> Dear Abby,
>
> Jan 27 is fine. Looking forward to seeing you.
>
> David thank you so much!
Do you have a current # for Chaya, or is it the same?
We just mailed off some pics for Tovi and Chevi...
Love,
Abby

FIG. 2B

PLACING EMAIL SUBSTRINGS IN A NEW CHRONOLOGICAL ORDER

FIELD OF THE INVENTION

The present invention relates generally to displaying and printing emails, and particularly to a method and system for placing, displaying and printing substrings of email strings in different chronological orders.

BACKGROUND OF THE INVENTION

Email message strings are a series of emails sent from one person to another. Referring to FIGS. 1A and 1B, the emails are displayed with the earliest email at the bottom of the string, the next earliest email on top of the earliest email and so forth until the most recent email is at the top of the string. Thus a user who wishes to read the earliest email must scroll down to the bottom of the string and then scroll upwards to read the email string in the correct chronological order.

SUMMARY OF THE INVENTION

The present invention seeks to provide a method and system for displaying and printing substrings of email strings in different chronological orders, as is described more in detail hereinbelow.

BRIEF DESCRIPTION OF THE DRAWINGS

The present invention will be understood and appreciated more fully from the following detailed description taken in conjunction with the drawings in which:

FIGS. 1A and 1B are simplified illustrations of prior art email strings;

FIGS. 2A and 2B are simplified illustrations of email strings, in accordance with embodiments of the present invention.

DETAILED DESCRIPTION OF EMBODIMENTS

Figure 3:
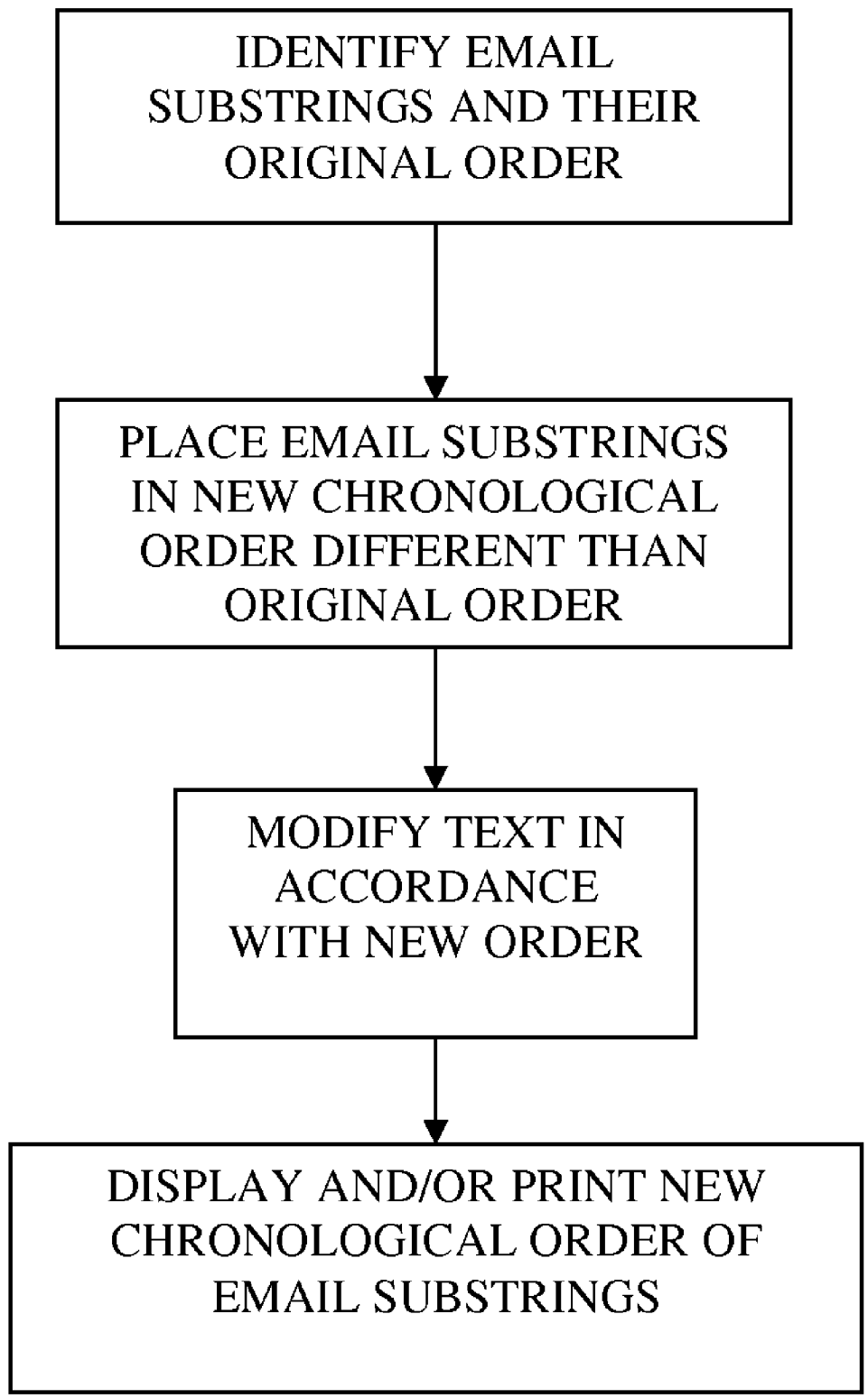
FIG. 3 is a simplified flow chart of a method for displaying and printing substrings of email strings in different chronological orders, in accordance with an embodiment of the present invention.

Reference is now made to FIG. 3, which is a simplified flow chart of a method for displaying and printing substrings of email strings in different chronological orders, in accordance with an embodiment of the present invention The method may include identifying a plurality of email substrings in an email string and an original order of the email substrings, and placing the email substrings in a new chronological order different than the original order.

As may be understood by comparing FIGS. 2A and 2B with FIGS. 1A and 1B, respectively, the new chronological order may be the reverse chronological order of the original order (other orders are also possible). The beginning and end of the email substrings may be identified by date, markers (e.g., >, >>, and the like) or any other suitable character or method. Cut and paste algorithms may be used to place the email substrings in the new order.

In accordance with another embodiment of the invention, text (words, phrases or characters and the like) may be modified in accordance with the new order. For example, in FIG. 1A, there is a phrase "referring to your below communication". In the new order in FIG. 2A, this refers to a communication that is now placed above this one. Thus, the word "below" may be replaced by the word "above" (or alternatively, the word "above" may appear after or before the original word "below" without deleting "below"). Furthermore, the word "above" may be marked in some manner (highlighted, italicized, put in parentheses, etc.) to denote that this is a change from the original text. Accordingly, the change in words may include a change in positional adjectives/adverbs (e.g., below" and "above") or chronological adjectives/adverbs (e.g., "before" and "after").

The method may further include displaying and/or printing the new chronological order of the email substrings.

The invention may make it easier or better to read a printout of the substrings of emails (e.g., if the substrings have suspense, the original order would have ruined the suspense by starting with the "punch line" at the very beginning of the printout).

In accordance with an embodiment of the present invention the method is implemented as part of an email package that provides emails or email service, such as but not limited to, OUTLOOK. The method may be carried out by clicking or otherwise selecting an icon, command box or window and the like. The term "email package" as used throughout the specification and claims encompasses such a package providing emails or email service as well as an add-on software that processes emails.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method comprising:
   as part of an email package, identifying a plurality of email substrings in an email string and an original order of said email substrings;
   re-positioning the email substrings in a new chronological order different than said original order;
   identifying a portion of positional or chronological text that has become incompatible with original text after said re-positioning; and
   modifying said portion of text to be compatible with the original text after said re-positioning, wherein modifying the portion of text comprises changing positional adjectives or adverbs or changing chronological adjectives or adverbs.

2. The method according to claim 1, wherein the new chronological order comprises a reverse chronological order of the original order.

3. The method according to claim 1, further comprising displaying the new chronological order of the email substrings.

4. The method according to claim 1, further comprising printing the new chronological order of the email substrings.

5. The method according to claim 1, further comprising making an indication that said portion of text has been modified.

6. The method according to claim 5, wherein making the indication comprises highlighting said portion of text.

7. The method according to claim 5, wherein making the indication comprises italicizing said portion of text.

8. The method according to claim 5, wherein making the indication comprises placing said portion of text in parentheses.

* * * * *